United States Patent [19]

Wada

[11] Patent Number: 5,276,800
[45] Date of Patent: Jan. 4, 1994

[54] IMAGE WRITING CONTROL UNIT HAVING MEMORY AREA FOR IMAGE

[75] Inventor: Koji Wada, Tokyo, Japan
[73] Assignee: NEC Corporation, Tokyo, Japan
[21] Appl. No.: 542,567
[22] Filed: Jun. 25, 1990
[30] Foreign Application Priority Data
  Jun. 23, 1989 [JP] Japan ................................ 1-161475
[51] Int. Cl.⁵ .............................................. G06F 15/20
[52] U.S. Cl. .................................. 395/162; 395/164; 395/400; 345/191
[58] Field of Search ............... 395/164–166, 400, 162; 340/798–800, 750

[56] References Cited

U.S. PATENT DOCUMENTS

| 4,839,826 | 5/1989 | Urushibata | 395/166 |
| 4,945,495 | 7/1990 | Ueda | 395/230 |
| 4,985,848 | 1/1991 | Pfeiffer et al. | 395/164 |
| 5,095,446 | 3/1992 | Jingu | 395/166 |

Primary Examiner—Robert L. Richardson
Assistant Examiner—Kee M. Tung
Attorney, Agent, or Firm—Sughrue, Mion, Zinn, Macpeak & Seas

[57] ABSTRACT

A control unit includes a first frame buffer and a second frame buffer as the memory area, a microprocessor, a shift circuit, a shift number register and a mask pattern generating circuit. An image data signal is output from the microprocessor. Shifting of respective words of the image data is performed by the shift circuit in compliance with a shift number signal output from the shift number register, for writing the words of the image data into the first and second frame buffers from desired bit positions corresponding to the shift numbers. Mask pattern signals nullifying bits, except the bits corresponding to the image data in output data of the shift circuit, are output from the mask pattern generating circuit. Selection between a high order side portion and a low order side portion of each word of the image data to be written into the frame buffers is performed by the least significant bit of an address signal. The address value input into the first buffer is incremented by "1" in an adder. The first frame buffer is accessed by address line output from the adder from which the least significant bit is removed, while the second frame buffer is accessed by address line output from the microprocessor. Access to address N or N+1 in the first frame buffer and address N+1 or N in the second frame buffer is thereby achieved.

2 Claims, 10 Drawing Sheets

IMAGE DATA OF 1 WORD

SHIFT OF X BITS

WRITING 1 WORD OF
HIGH ORDER SIDE TO
ADDRESS N IN THE
FRAME BUFFER

WRITING 1 WORD OF
LOW ORDER SIDE TO
ADDRESS N+1 IN THE
FRAME BUFFER

FIG. 5

OUTPUT DATA OF MICROPROCESSOR

| A1 | | An |
|---|---|---|
| an | ...... | a1 |

BIT ADDRESS = 0

| B1 | | Bn | Bn+1 | | B2n |
|---|---|---|---|---|---|
| an | .......... | a1 | an | .......... | a1 |

BIT ADDRESS = x

| ax | ...... a1 | an | .......... a1 | an | ...... ax+1 |

BIT ADDRESS = n-1

| an+1 | .......... a1 | an | .......... a1 | an |

FIG. 6

BIT ADDRESS = 0

| D1 | | Dn | Dn+1 | | D2n |
|---|---|---|---|---|---|
| 1 | .......... | 1 | 0 | .......... | 0 |

BIT ADDRESS = x

| 0 ...... 0 | 1 .......... 1 | 0 ........ 0 |

BIT ADDRESS = n-1

| 0 .......... 0 | 1 .......... 1 | 0 |

FIG. 7

BIT ADDRESS = 0

| Dn+1 | | D2n | D1 | | Dn |
|---|---|---|---|---|---|
| 0 | .......... | 0 | 1 | .......... | 1 |

BIT ADDRESS = x

| 1 ...... 1 | 0 .......... 0 | 1 ...... 1 |

BIT ADDRESS = n-1

| 1 .......... 1 | 0 .......... 0 | 1 |

FIG. 8(a)

| ADDRESS VALUE OF MICROPROCESSOR | ADDRESS OF FRAME BUFFER 13 | ADDRESS OF FRAME BUFFER 14 |
|---|---|---|
| 0 | 0 | 0 |
| 1 | 1 | 0 |
| 2 | 1 | 1 |
| 3 | 2 | 1 |
| 4 | 2 | 2 |
| ⋮ | ⋮ | ⋮ |
| 2n-1 | n | n-1 |
| 2n | n | n |
| 2n+1 | n+1 | n |
| ⋮ | ⋮ | ⋮ |

FIG. 8(b)

FRAME BUFFER 13

| 0 |
|---|
| 2 |
| ⋮ |
| 2n |
| ⋮ |

FRAME BUFFER 14

| 1 |
|---|
| 3 |
| ⋮ |
| 2n+1 |
| ⋮ |

ALLOCATION OF ADDRESSES OF ADDRESS LINE OUTPUTTED FROM THE MICROPROCESSOR TO THE FRAME BUFFER 13 AND THE FRAME BUFFER 14

FIG. 8(c)

FRAME BUFFER 13

| 0 |
|---|
| 1 |
| ⋮ |
| n |
| ⋮ |

FRAME BUFFER 14

| 0 |
|---|
| 1 |
| ⋮ |
| n |
| ⋮ |

REAL ADDRESSES OF FRAME BUFFERS

ACCESS OF ADDRESS OF EVEN NUMBER

ACCESS OF ADDRESS OF ODD NUMBER

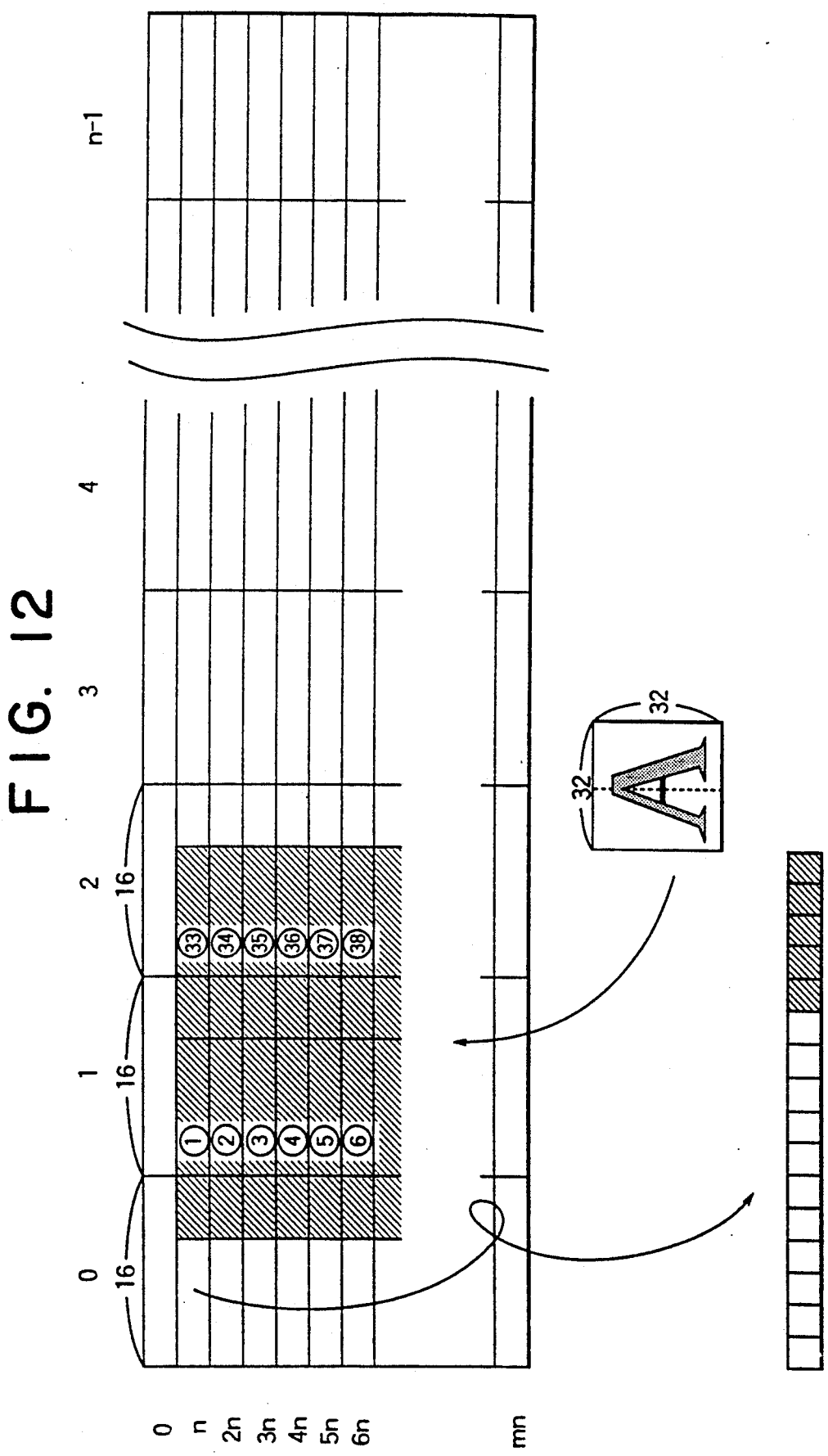

IMAGE WRITING CONTROL UNIT HAVING MEMORY AREA FOR IMAGE

BACKGROUND OF THE INVENTION

The present invention relates to an image writing control unit and particularly to a control unit for writing image data to a memory area referred to as a frame buffer with each bit corresponding to each pixel of image.

Conventionally, in such an image writing control unit, when 1 word of image data is written into the frame buffer with positioning said word of the image data over a word boundary of memory forming the frame buffer, 1 word of the image data are shifted by necessary bit number (X bits) as shown in FIG. 1, and thereafter by time division 1 word of high order side after shifting is accessed to address N in the frame buffer and then 1 word of low order side after shifting is accessed to address N+1 in the frame buffer. Therefore access time of 2 words of image data into the frame buffer is required for said word of image data bestriding a word boundary.

SUMMARY OF THE INVENTION

It is an object of the present invention to provide an image writing control unit in which it is possible to write image data in access time of one access to the frame buffers for a word of the image data.

The above-mentioned object of present invention is attained by that in an image writing control unit having a memory area of image in which binary image data are stored with bits each of which corresponds to each pixel, said image writing control unit comprises: a first frame buffer and a second frame buffer as the memory area; a shift number register for storing shift numbers of the image data by which the image data are to be shifted for respective words thereof; a shift circuit which carries out shifting of respective words of the image data in compliance with shift number signal outputted from the shift number register for writing said words of the image data into the first and second frame buffers from necessary bit positions corresponding to the shift numbers; a mask pattern generating circuit which outputs mask pattern signals nullifying bits except the bits corresponding to the image data in output data of the shift circuit; a first muliplexer carrying out the selection between a high order side portion and a low order side portion of each word of the image data to be written into the frame buffers by the least significant bit of address signal inputted into said first multiplexer; a second multiplexer carrying out the selection between a high order side portion and a low order side portion of each word of the image data read out from the two frame buffers by the least significant bit of address signal inputted into said second multiplexer; and an adder which increments address value inputted into the first buffer by "1".

Further the above-mentioned object of the present invention is attained by that in an image writing control unit having a memory area of image in which binary image data are stored with bits each of which corresponds to each pixel, said image writing control unit comprises; a first frame buffer and a second frame buffer as the memory area; a shift number register for storing shift numbers of the image data by which the image data are to be shifted for respective words thereof; a shift circuit which carries out shifting of respective words of the image data in compliance with shift number signal outputted from the shift number register, for writing said words of the image data into the first buffer from necessary bit positions corresponding to the shift numbers; a mask pattern generating circuit which outputs signal of mask pattern signals for masking bits except the bits corresponding to the image data in output data of the shift circuit and an inverted mask pattern signal in which the mask pattern is inverted for the read out data signal sent from the two frame buffers; a first AND circuit which carries out the logical AND between the output data signal outputted from the shift circuit and the mask pattern signal outputted from the mask pattern generating circuit; a second AND circuit which carries out the logical AND between the read out data signal sent from the two frame buffers and the inverted mask pattern signal; an OR circuit which carries out the logical OR between output signal outputted from the first AND circuit and output signal outputted from the second AND circuit; a first multiplexer carrying out the selection between a high order side portion and a low order side portion of each word of the image data to be written into the frame buffers by the least significant bit of address signal inputted into said first multiplexer; a second multiplexer carrying out the selection between a high order side portion and a low order side portion of each word of the image data read out from the two frame buffers by the least significant bit of address signal inputted into said second multiplexer; and an adder which increments address value inputted into the first buffer by "1".

According to the present invention, it is possible to write image data in access time taken to gain access to the frame buffers for a word of the image data, by using the first frame buffer accessed by address line having addresses from which the least significant bit is removed and the second frame accessed address line having addresses being incremented by "1" from which the least significant bit is removed. Therefore it is possible to carry out at the same time access to address N or N+1 in the first buffer and access to address N+1 or N in the second frame buffer.

BRIEF DESCRIPTION OF THE DRAWINGS

FIG. 5 is an illustration showing output data of the shift circuit at various bit address values;

FIG. 6 is an illustration showing output data of mask pattern generating circuit at various bit values which are, inputted into first AND circuit shown in FIG. 2;

FIG. 7 is an illustration showing output data of mask pattern generating circuit at various bit values which are inputted into second AND circuit shown in FIG. 2;

FIGS. 8 (a), (b) and (c) are an illustration showing a relation between address values of microprocessor shown in FIG. 2 and addresses of frame buffer 13 and frame buffer 14;

FIG. 12 is an illustration showing a relation between the frame buffer and printed paper.

DETAILED DESCRIPTION OF THE INVENTION

Figure 2:
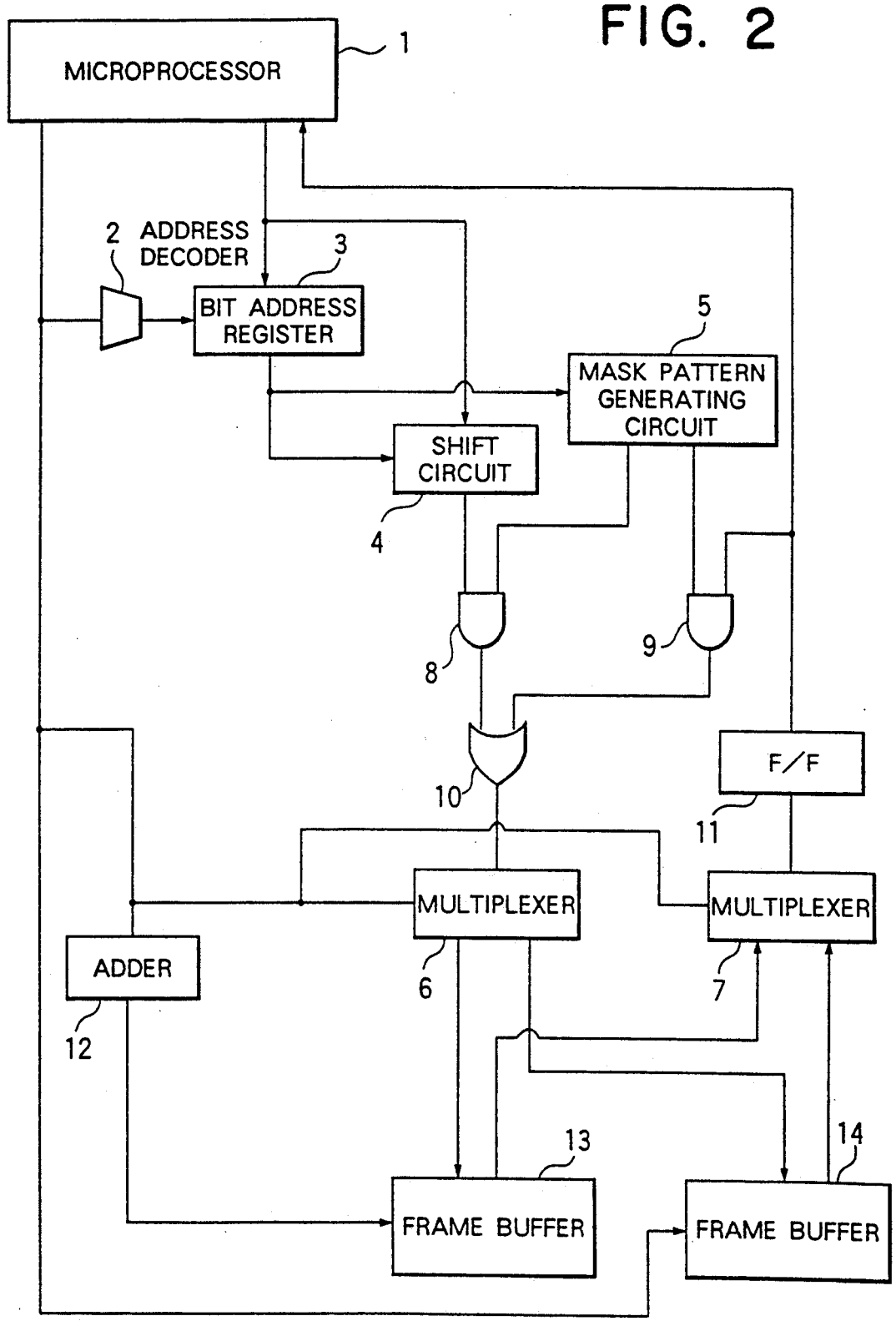
FIG. 2 is a schematic block diagram of an embodiment of the present invention.

FIG. 2 shows a block diagram of a preferred embodiment of the present invention.

Figure 3:
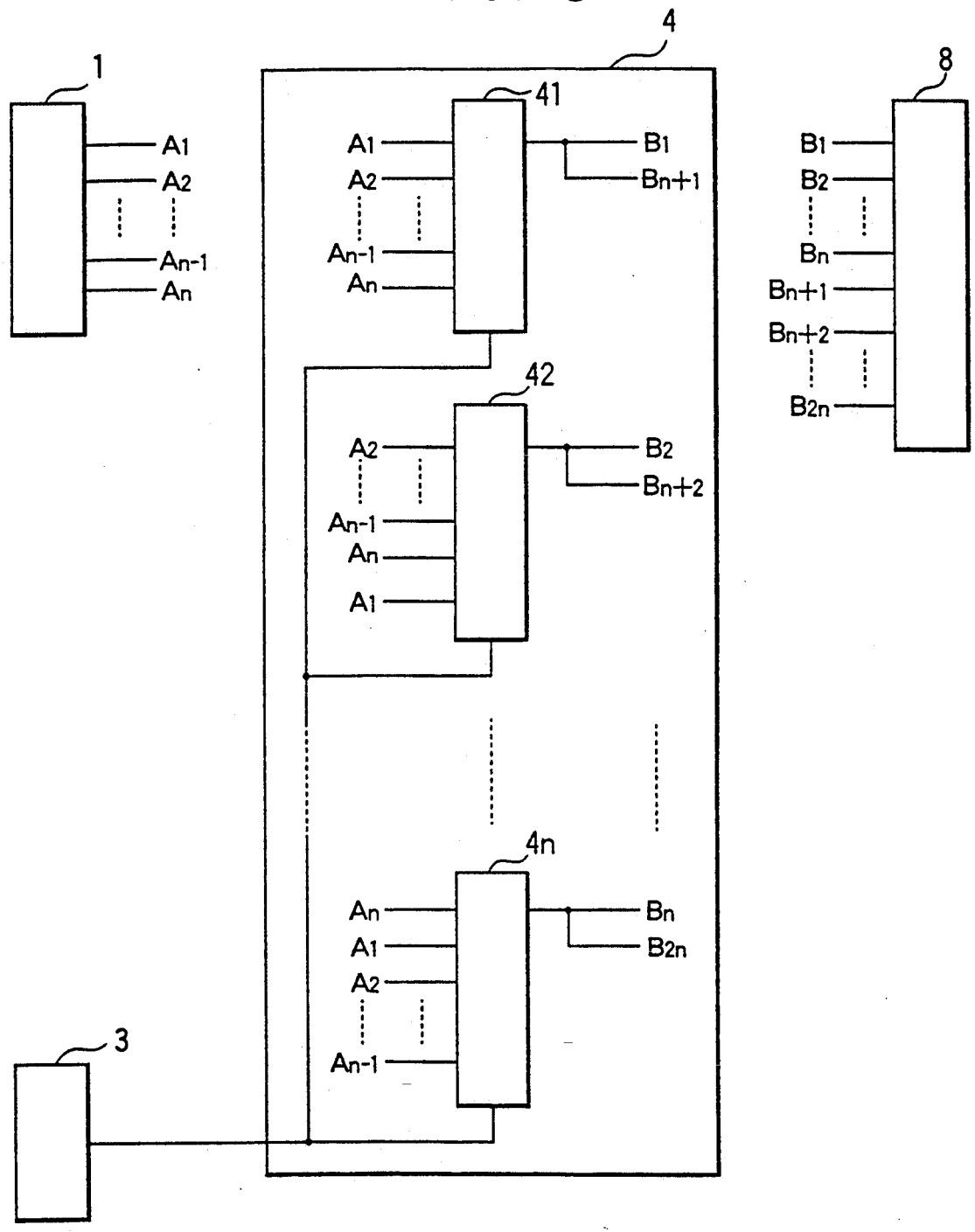
FIG. 3 is a block diagram of shift circuit shown in FIG. 2.

A microprocessor 1 carries out the transfer and receipt of image data and writing information, modification of image data, and writing control of image data. First, the microprocessor 1 receives image data and image information attached to the image data from a host device or a host processor, while the microprocessor 1 decodes bit address values for bit addressing from the image data and selects a bit address register 3 through an address decoder 2 and makes the bit address register 3 store the bit address values. And the microprocessor 1 carries out modification such as inversion, shift and the like, and writes the image data to a frame buffer 13 and a frame buffer 14 after have been modified. At this time, the image data signal outputted from the microprocessor 1 is shifted by the bit address value stored in the bit address register 3 by a shift circuit 4. The shift circuit 4 has a structure as shown in FIG. 3, which has multiplexers 41–4n in which one word selects 1 bit from n bits for the image data of n bits. The multiplexers 41, 42, 43 . . . 4n are connected with the microprocessor 1 and the bit address register 3. The multiplexer 41 selects bit An from output data A1–An of the microprocessor in compliance with signal outputted from the bit address register 3 and outputs B1 and Bn+1 of bit An. The multiplexer 42 selects bit An−1 from the output data A1-An of the microprocessor in compliance with signal outputted from the bit address register 3 and outputs B2 and Bn+2 of bit An−1. Similarly the multiplexers 43, 44, 45 . . . 4n select bit An−2, bit An−3, bit An−4 . . . bit A1, from the output data A1-An of the microprocessor in compliance with signal outputted from the bit address register 3 and outputs B3 and Bn+3, B4 and Bn+4, B5 and Bn+5 . . . Bn and B2n, respectively. When a bit address value is of X bits, output data A1-An of the microprocessor 1 are shifted by X bits by inputting output data A1-An to n multiplexers 41–4n with shifting output data A1-An of the microprocessor 1 bit by bit. As a result, output data B1-B2n of the multiplexer 4 as shown in FIG. 5 are obtained.

Figure 4:
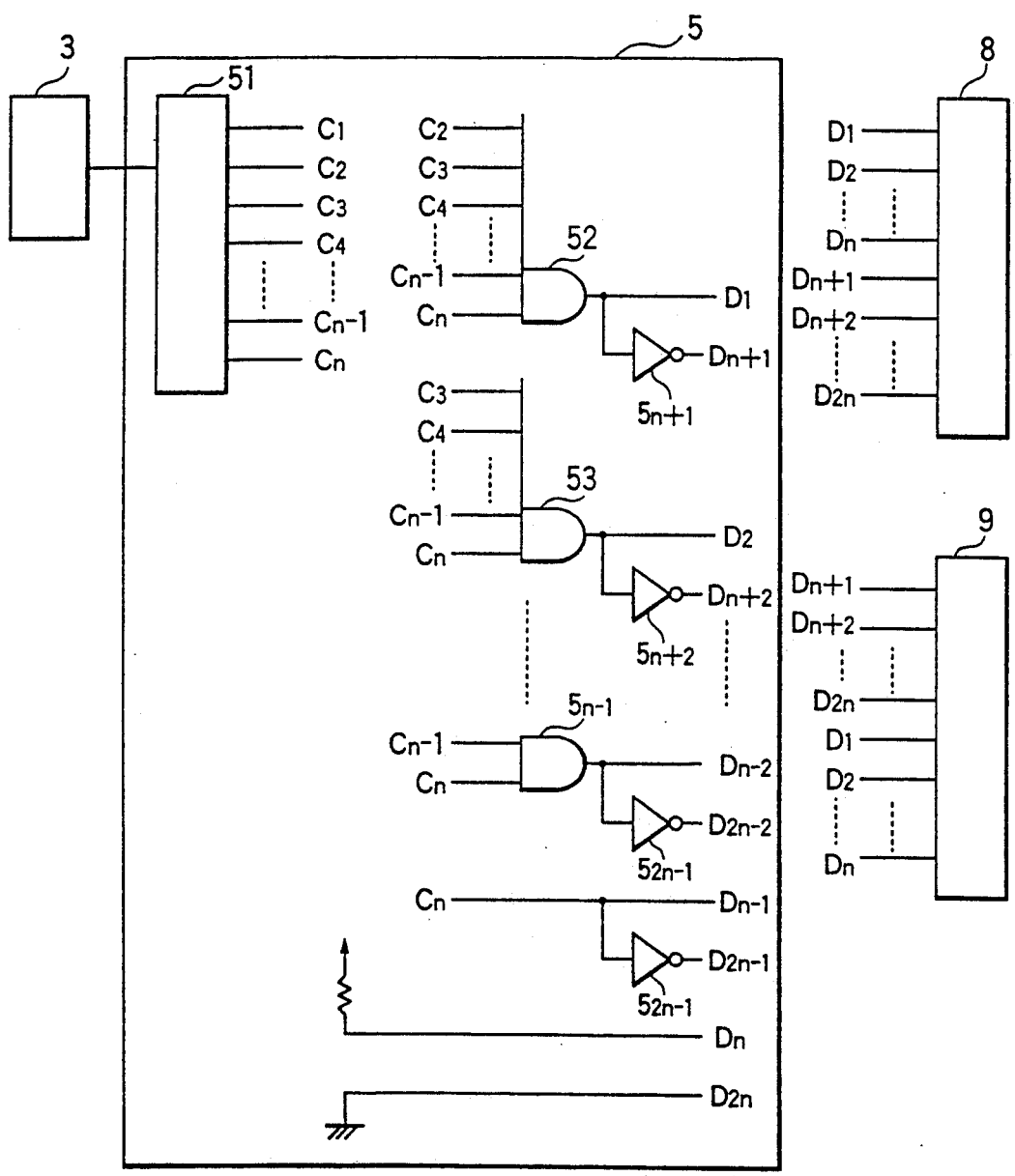
FIG. 4 is a block diagram of mask pattern generating circuit shown in FIG. 2.

Further, a mask pattern generating circuit 5 has a structure as shown in FIG. 4, which inputs output data C1-Cn of a decoder 51 with n bits of output which decodes a bit address value into OR circuits 52-5n−1 as shown in FIG. 4. Output data of the OR circuits 52-5n−1 are outputted as output data D1-Dn−1 of the mask pattern generating circuit 5, and inversion circuits 5n+1-52n−1 are connected with the OR circuits 52-5n−1, which invert output data of the OR circuits 52-5n−1 and output data Dn+1-D2n−1 of the mask pattern generating circuit 5, wherein output data D1-Dn, Dn+1-D2n of the mask pattern generating circuit 3 as shown in FIG. 6 and output data Dn+1-D2n, D1-Dn of output data Dn+1 D2n, D1-Dn as shown in FIG. 7 are obtained by outputting a signal pulled-up to "1" as output data Dn of the mask pattern generating circuit 5 and by outputting a signal pulled-down to "0" as output data D2n of the mask pattern generating circuit 5. Hereupon, when an image is overwritten on a certain image which has been already drawn (written) on the frame buffer 13 and on the frame buffer 14, read-modified write is necessary for overwriting the image on the frame buffer 13 and on the frame buffer 14 after the data which has been already written into address on which image data is to be overwritten are read out from the frame buffer 13 and the frame buffer 14 and the multiplexer 7 carries out the logical OR between the read out data and the already written data. In the read modified write, the read out data is held in a latch flip-flop 11. When the read modified write is not necessary, that is when overwriting is not carried out but only writing is carried out, output of the latch flip-flop 11 is kept at 0.

Further, address line outputted from the microprocessor 1 from which the least significant bit thereof is removed has access to the frame buffer 14. An adder 12 carries out incrementing address value outputted from the microprocessor 1 by "1" Address line forming the address value which is incremented by "1" from which least significant bit thereof is removed has access to the frame buffer 13.

Figure 9A:
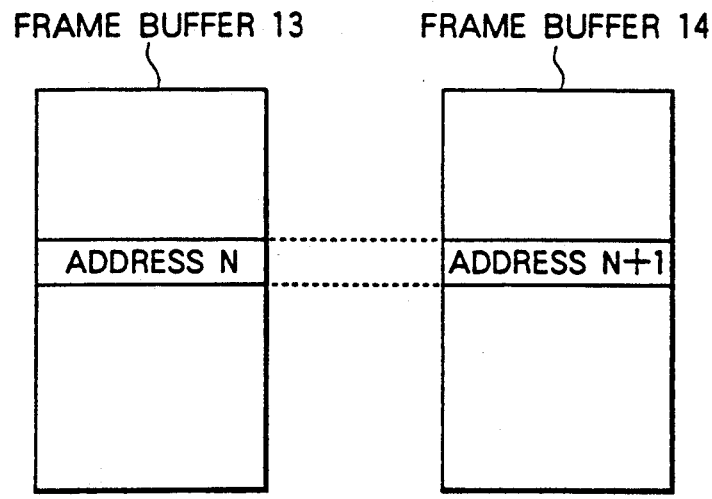
FIGS. 9(a) and 9(b) are an illustration showing accesses of microprocessor into two frame buffers.
Figure 9B:
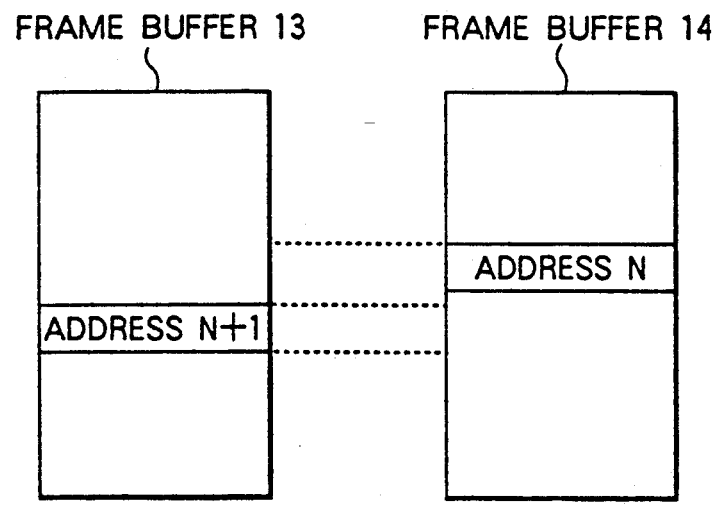
Figure 10:
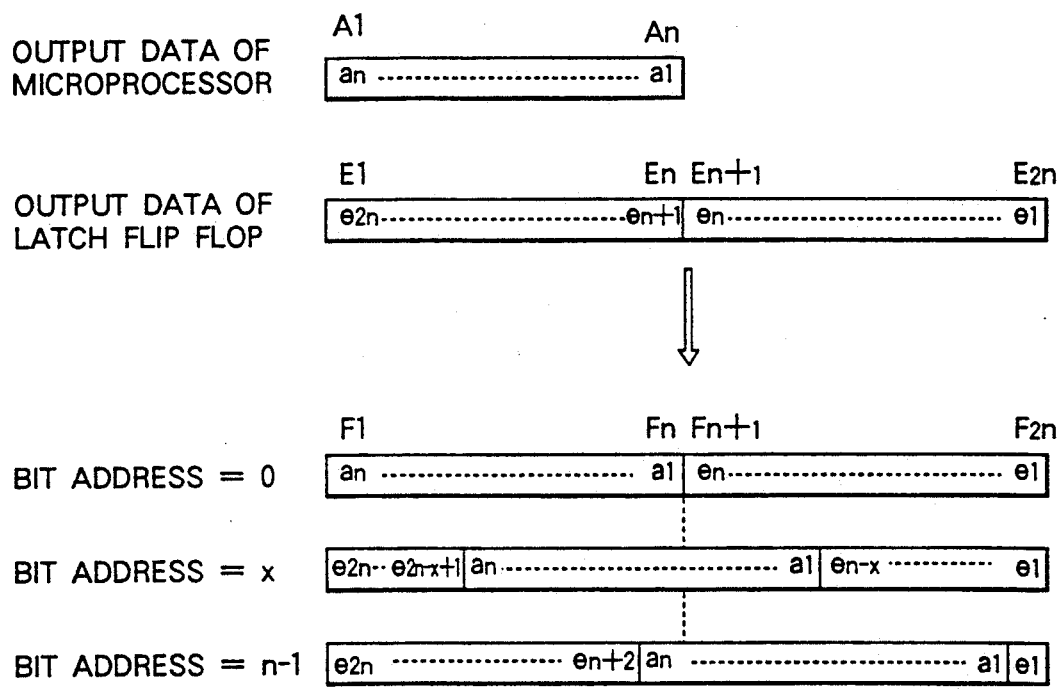
FIG. 10 is an illustration showing output data of OR circuit shown in FIG. 2.
Figure 11:
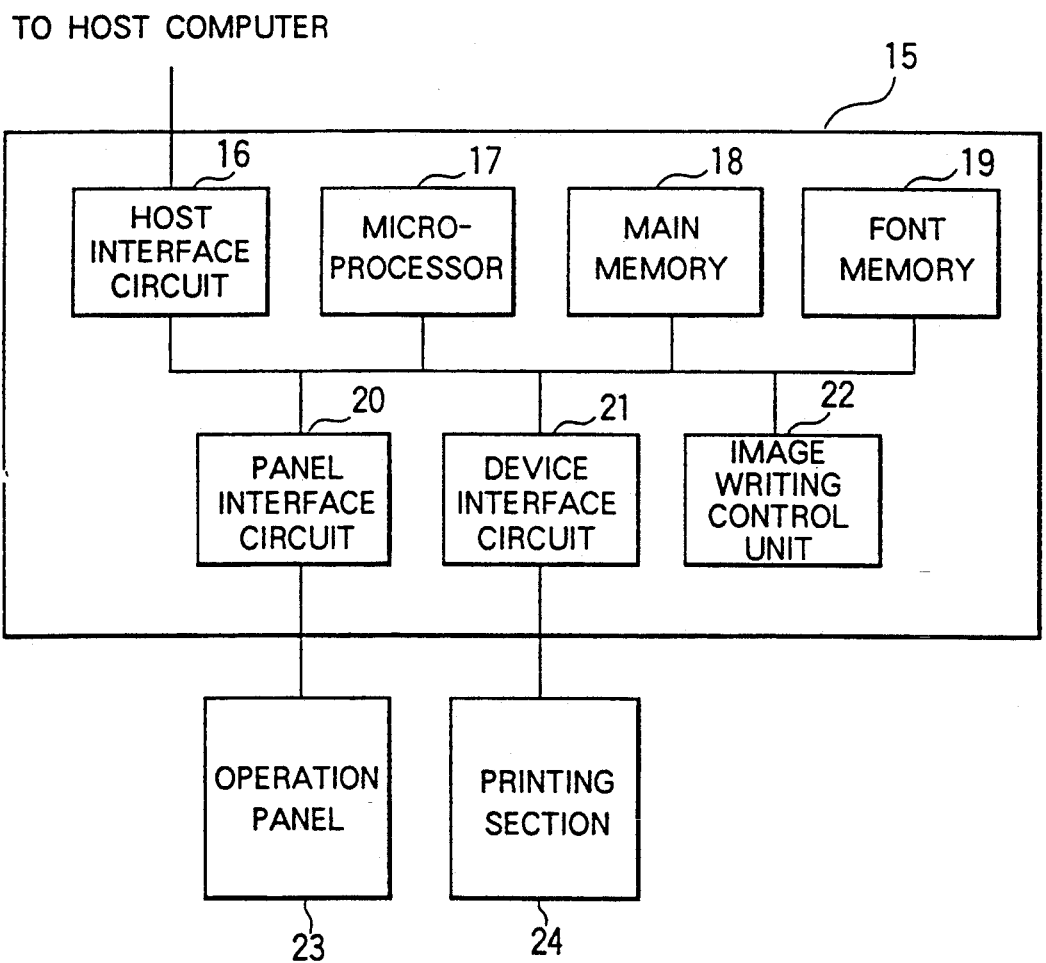
FIG. 11 is a block diagram showing a printer including image writing control unit according to the invention.

FIG. 8 (a) shows a relation between the address value outputted from the microprocessor 1 and addresses of the frame buffer 13 and the frame buffer 14. FIG. 8 (b) shows allocation of addresses of address line outputted from the microprocessor to the frame buffer 13 and the frame buffer 14. FIG. 8 (c) shows a relation between real addresses of the frame buffer 13 and the frame buffer 14. According to the above-mentioned method of access to the frame buffers, it is possible to have at the same time access to both address N and address N+1, with respect to access of address line of from the microprocessor 1 to address N in the frame buffer. Accesses to the frame buffer 13 and the frame buffer 14 are carried out as shown in FIGS. 9 (a) and (b), depending upon whether address N is an even number or an odd number. In the case of access to address of an even number as shown in FIG. 9 (a), in a write cycle, 1 word of high order side of write data is written to the frame buffer 13, and 1 word of low order side thereof is written to the frame buffer 14. In a read cycle, the content of the frame buffer 13 is read out as 1 word of high order side of read out data and the content of the frame buffer 14 is read out as 1 word of low order side thereof. However in the case of access to address of an odd number, in a write cycle, 1 word of high order side of write data should be written to the frame buffer 14, and 1 word of low order side of write data should written to the frame buffer 13, and in a read cycle, the content of the frame buffer 14 should be read out as 1 word of high order side of read out data and the content of the frame buffer 13 should be read out as 1 word of low order side thereof. Therefore, selection of 1 word of high order side or 1 word of low order side of write data is carried out by the multiplexer 6 and selection of 1 word of high order side or 1 word of low order side of read data is carried out by the multiplexer 7, by determining whether access is access to address of an even number or access to address of an odd number on the basis of the least significant bit of address line outputted from the microprocessor 1, respectively. An AND circuit 8 carries out the logical AND between output data B1-B2n of the shift circuit 4 and output data D1-Dn and Dn+1-D2n of the mask pattern generating circuit 5. An AND circuit 9 carries out the logical AND between output data E1-E2n of the latch flip-flop 11 and output data Dn+1-D2n and D1-Dn of the mask pattern generating circuit 5. Further, an OR circuit 10 carries out the logical OR between output data of the OR circuit 8 and output data of the AND circuit 10. Output data F1-F2n of the OR circuit 10 is as shown in FIG. 10. Selection of a word of high order side or a word of low order side is carried out by the multiplexer 6, and then writing to the frame buffer 13 and the frame buffer 14.

Then an example of a printer device including an image writing control device is explained.

Figure 1:
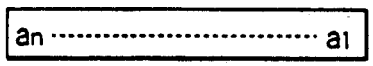
FIG. 1 is a schematic illustration showing a method of image writing control.
Figure 1:
Figure 1:
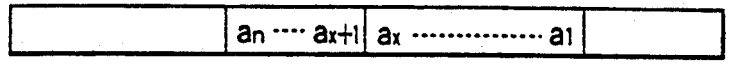
Figure 1:
Figure 1:
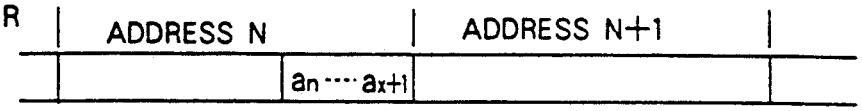
Figure 1:
Figure 1:
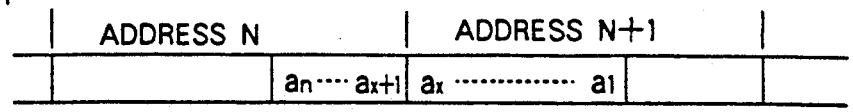

The printer comprises a control section 15, a control panel 23 and a printing section 24. The control section 15 comprises a host interface circuit 16, a microprocessor 17, a main memory 18, a font memory 19, a panel interface circuit 20, a device interface circuit 21, and an image writing control device 22 according to the present invention (shown in FIG. 1) all of which are connected through bus with each other. The control panel 23 is connected to the panel interface circuit 20 and the printing section 24 is connected to the device interface circuit 21. In the control section 15, the host interface circuit 16 carries out sending/receiving of data between the host interface circuit and the host computer (not drawn) by the control of the microprocessor 17. The microprocessor 18 controls all the control section 15. Data sent from the host computer are sent through the host interface circuit 16 to the microprocessor 17 in which the data are interpretated and editted. The main memory 18 is a memory used as receiving data buffer, a communication area with the image writing control device 22, various tables and a work area. The image writing control device 23 generates an image data from data which the microprocessor 17 edits following the instruction of the microprocessor 17. The font memory 19 stores the information on character pattern which is a bit mapped font developed two-dimensionally. The control panel 23 has a display facility and a manual input facility. The panel interface circuit 20 carries out the detection of display signal and input signal sent to the control panel 23 by the control of the microprocessor 17. The device interface circuit 21 carries out the communication with the printing section 24 and the transfer of image data by the control of the microprocessor 17. The printing section 24 performs the operation of paper feeding, recording (printing) and delivery following the instruction sent from the microprocessor 17 through the device interface circuit 21.

Then operation of the above-mentioned printer is explained. First, ordinary operation of printing is explained. The microprocessor 17 outputs data sent from the host computer through the host interface circuit 16 into the main memory 18 in which the data are stored in a receive buffer, while the data in the receive buffer is analized and data on a 1 page are edited. Thereafter the main memory 18 activates the image writing control device 22. The image writing control device 22 reads out the necessary character pattern information from the font memory and writes character pattern to the image memory (the frame buffer). When image data on 1 page are generated on the image memory, the micro processor 17 issues a printing instruction to the printing section 24. The printing section 24 carries out paper feeding following the printing instruction, printing the image data transferred from the image memory through the device interface circuit 20 on a printing paper and delivering printed paper. Further, the microprocessor 17 displays the condition of the printing section on the display facility of the control panel 23, in case of need. An operator knows the condition of the printing section from the display facility and stops or starts printing by operating the control panel 23 by manual input following the information on the condition of the printing section.

FIG. 12 shows a relation between the image data on the image memory (the frame memory) and a pattern "A" printed out on a printing paper.

In the figure, numerals aligned on the left and on the top designates allocation of addresses of address line of from the microprocessor to the frame buffers and sum of these numerals becomes the address value.

Hereupon, the basic processing is carried out as 1 word being 16 bits. Therefore, in the figure, blocks of 16 bits in length are arranged in two-dimensional array of m−1 blocks by n blocks.

Now, an example of printing "A" is explained. Font pattern of "A" is divided into 16 bits units and processed. In the present invention, the image data on "A" are developed in order as shown in ①, ②, ③ . . . Therefore addresses which the microprocessor outputs stand in order of n→2n→3n . . . 32n→n+1→2n+1 . . . After printing of the character pattern "A" terminates, the following character pattern is printed out by the side of it.

What is claimed is:

1. An image writing control unit having a memory area of image in which binary image data are stored with bits each of which corresponds to each pixel, said image writing control unit comprising:
    a first frame buffer and a second frame buffer as the memory area;
    a shift number register for storing shift numbers of the image data by which the image data are to be shifted for respective words of the image data;
    a shift circuit which carries out shifting of respective words of the image data by a number indicated by a shift number signal outputted from the shift number register for writing said words of the image data into the first and second frame buffers from necessary bit positions corresponding to the shift numbers;
    a mask pattern generating circuit which outputs mask pattern signals for masking bits except bits of the image data in output data of the shift circuit;
    a first multiplexer carrying out the selection between a high order side portion and a low order side portion of each word of the image data to be written into the frame buffers by the least significant bit of address signal inputted into said first multiplexer;
    a second multiplexer carrying out the selection between a high order side portion and a low order side portion of each word of the image data read out from the two frame buffers based on the least significant bit of an address signal inputted into said second multiplexer; and
    an adder which increments address value inputted into the first buffer by "1".

2. An image writing control unit having a memory area of image in which binary image data are stored with bits each of which corresponds to each pixel, said image writing control unit comprising:
    a first frame buffer and a second frame buffer as the memory area;

a shift number register for storing shift numbers of the image data by which the image data are to be shifted for respective words of the image data;

a shift circuit which carries out shifting of respective words of the image data by a number indicated by a shift number signal outputted from the shift number register for writing said words of the image data into the first buffer from necessary bit positions corresponding to the shift numbers;

a mask pattern generating circuit which outputs mask pattern signals for masking bits except bits of the image data in output data of the shift circuit and an inverted mask pattern signal in which the mask pattern is inverted for a read out data signal sent from the two frame buffers;

a first AND circuit which carries out the logical AND between the output data signal outputted from the shift circuit and the mask pattern signal outputted from the mask pattern generating circuit;

a second AND circuit which carries out the logical AND between the read out data signal sent from the two frame buffers and the inverted mask pattern signal;

an OR circuit which carries out the logical OR between output signal outputted from the first AND circuit and output signal outputted from the second AND circuit;

a first multiplexer carrying out the selection between a high order side portion and a low order side portion of each word of the image data to be written into the frame buffers based on the least significant bit of an address signal inputted into said first multiplexer;

a second multiplexer carrying out the selection between a high order side portion and a low order side portion of each word of the image data read out from the two frame buffers by the least significant bit of address signal inputted into said second multiplexer; and an adder which increments address value inputted into the first buffer by "1".

* * * * *